UNITED STATES PATENT OFFICE.

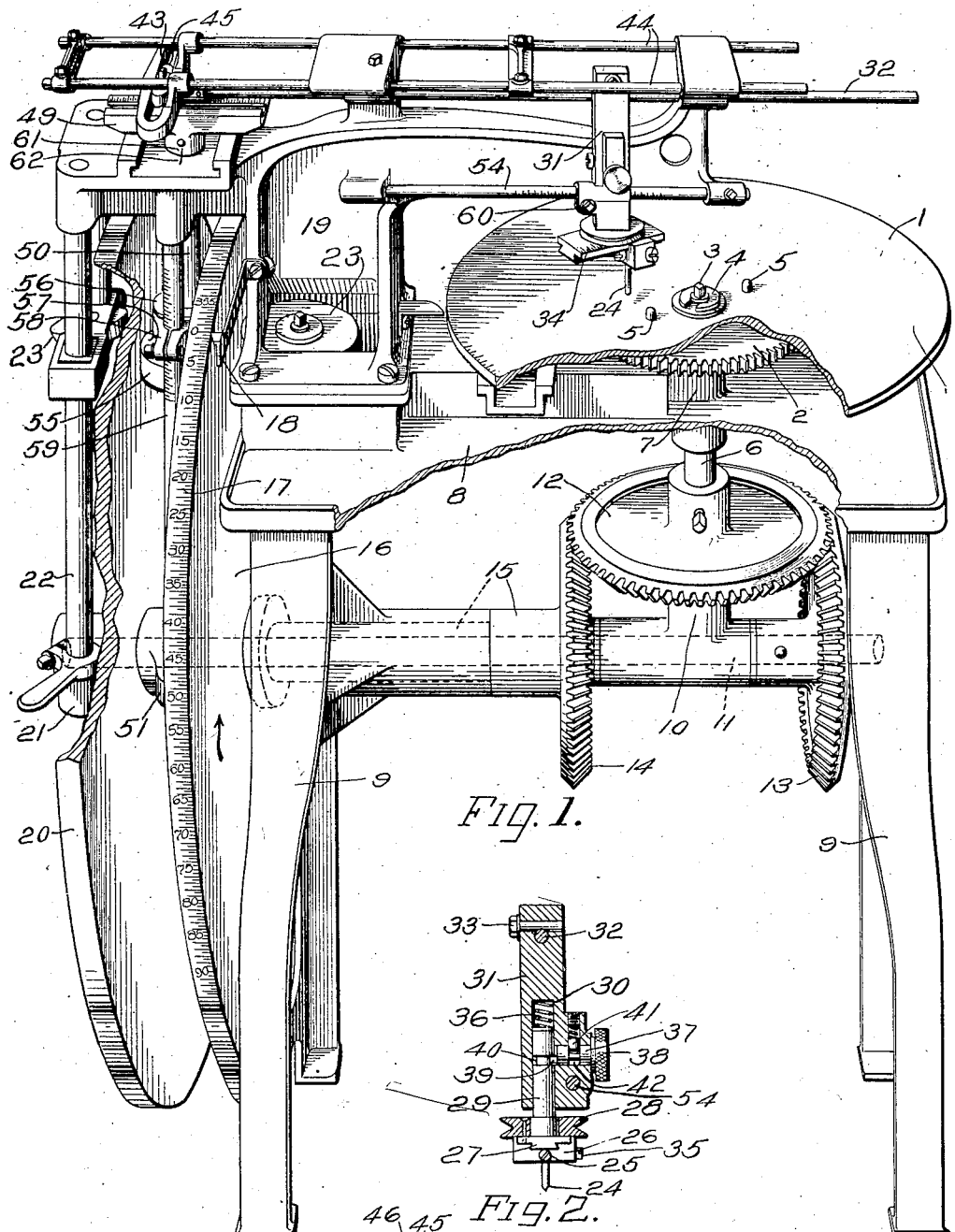

EDWARD E. FOSTER, OF BEVERLY, MASSACHUSETTS.

CAM-PATH-GENERATING MACHINE.

1,347,085.  Specification of Letters Patent.  Patented July 20, 1920.

Application filed October 24, 1913. Serial No. 797,078.

*To all whom it may concern:*

Be it known that I, EDWARD E. FOSTER, a citizen of the United States, residing at Beverly, in the county of Essex and State of Massachusetts, have invented a new and useful Improvement in Cam-Path-Generating Machines, of which the following is a specification.

As well known to those skilled in the art, it is customary in the manufacture of cams to first generate the cam path upon paper, and then scratch the outline of the generated cam path upon a leader. The leader is then cut down to the inner working surface of the path after which it is inserted into a cam cutting machine where it directs the operation of the cutting tool. As there are three principal kinds of motion imparted to a follower by a cam, namely, harmonic, uniform and gravity motions, to generate a cam path so that it will impart the proper motion to a follower, including the proper sequence of rises, drops and dwells requires considerable knowledge, experience and skill upon the part of the designer especially as these cam paths are continuous or closed and are usually provided with differential drops or rises—that is having motion sections, the sections having different drops or rises. By a gravity motion cam path I mean a cam path that will impart to a follower a uniformly accelerated or a uniformly retarded momentum corresponding to the uniformly accelerated or uniformly retarded momentum imparted by gravity to falling or ascending bodies, respectively. I have discovered that some of the well known mechanical devices are adapted to impart motions corresponding to the harmonic, uniform and gravity motions of a cam follower. For instance, a crank in rotating through 180 degrees imparts harmonic motion to a driven member, a swinging pendulum has a gravity motion, and an inclined plane imparts to a driven member equal rises in equal intervals of time or uniform motion. Therefore, I have conceived the idea of utilizing mechanism in the generation of cam paths. I believe I am the first to have employed mechanism to generate a continuous or closed cam path having differential drops or rises or times therein.

The object of the present invention is to produce a machine by which cam paths for imparting any kind of motion to a follower may be accurately generated by an operative having little or no training in the designing of cams.

To the accomplishment of this object, and such others as may hereinafter appear, the features of the invention relate to certain devices, combinations and arrangements of parts, hereinafter described and then set forth broadly and in detail in the appended claims, which possess advantages which will be apparent to those skilled in the art.

The various features of the present invention will be best understood from an inspection of the accompanying drawings illustrating one embodiment of the invention, in which, Figure 1 is a perspective of a machine for generating a cam path for imparting a harmonic motion to a reciprocating follower;

Fig. 2 is a longitudinal sectional elevation of the tool frame and the parts carried thereby, and Fig. 3 is a sectional elevation of the crank and associated parts.

In the illustrated embodiment of the invention the cam path is generated directly upon a leader by a tool which is rotated to scribe a circle upon the leader having a diameter substantially equal to the diameter of the follower employed with the cam. The leader is rotated to transfer the point of operation of the tool around the leader and the tool is reciprocated radially of the leader during the rotation thereof to change the direction of the path scribed by the tool upon the leader. The tool is reciprocated by a crank in the specific form of the invention selected for the purpose of illustration and consequently a cam path for imparting a harmonic motion to the cam follower is generated. In order to adapt the machine for generating any desired cam path adjustments are provided for varying the operation of the tool in accordance with variations in the base circles, rises, drops, dwells and times in the different forms of cams to be designed. The leader 1, which may be either of zinc or of cast-iron having a thin deposit of copper upon its face, is clamped to the upper face of a gear 2 by a nut 3 and washer 4 and is held from rotation on the gear 2 by a pair of pins 5 projecting from the gear and arranged to engage a pair of holes formed in the leader. The gear 2 is secured to the upper end of a vertical shaft 6 journaled at one end in a boss 7 suitably bored in a table 8 carried by legs 9, and at the other end in a step bearing formed in a sleeve 10 loosely mounted on a horizontal shaft 11 journaled in bearings depending from the table 8. The shaft 6 also carries a bevel gear 12 which meshes with a gear 13 carried by the shaft 11, and also with a gear 14 carried by a sleeve 15 loosely mounted on the shaft 11. Secured to the sleeve 15 is a disk 16 which is provided with a scale 17 on its periphery coöperating with a pointer 18 secured to an overhanging bracket 19 carried by the table 8. This scale is graduated in degrees from 0 to 360 and the gears 13 and 14 proportioned to impart a complete rotation to the leader when the disk 16 is rotated to transfer the pointer 18 one complete revolution around the periphery of the disk. Splined to the shaft 11 is a second disk 20 which is held in position on the shaft by a clamping roll 21 eccentrically mounted on a vertical rod 22 carried by the bracket 19. As shown in Fig. 1 the back faces of the disks rotate in engagement with the rolls 23 which hold the disks pressed toward each other.

In order to scratch the cam path upon the leader 1 the machine is provided with a scratching tool 24 which is held by a screw 25 in a block 26 carried by a carrier 27. The carrier 27 is secured to a sheave 28 carried by the lower end of a vertical shaft 29 which is rotatably mounted in a chamber 30 formed in a frame 31. The frame 31 is secured to a horizontal rod 32, mounted to reciprocate in the bracket 19, by a clamping bolt 33. The sheave 28 is driven from some suitable source of power so that the tool may be rapidly driven to scratch a circle upon the face of the leader and thus form a closed cam path when transferred around the leader. As the diameter of this circle is substantially equal to the width of the cam path, or the diameter of the cam follower, provision is made for adjusting the tool to scratch different sizes of circles in accordance with the different widths of cam paths to be generated. To this end the block 26 may be adjusted in ways formed on the carrier 27 in a path transverse to the axis of rotation of the shaft 29. With this construction the tool 24 may be actuated to form a point upon the leader when the tool is adjusted in line with the axis of the shaft 29, or may be actuated to scratch a circle having a diameter equal to the length of the carrier 27 when the tool is placed at one end of the carrier. To serve as a guide for the adjustment of the block 26 on the carrier 27 the carrier is provided with a scale 34. The adjusted position of the tool 24 on the carrier 27 is maintained by a clamping screw 35 arranged to bind the block 26 on the ways of the carrier 27. The tool 24 is pressed against the face of the leader by a spring 36 which is interposed between the top of the shaft 29 and the end of the chamber 30. In order to elevate the tool 24 against the tension of the spring 36 the frame 31 carries a horizontal shaft 37 one end of which is provided with a knurled knob 38 and the other end of which carries an eccentrically mounted pin 39 arranged to engage a groove 40 formed in the shaft 29. With this construction a turn of the knob 38 elevates the tool from the face of the leader. To hold the tool elevated the frame 31 carries a spring plunger 41 which engages a groove 42 formed in the shaft 37.

With the construction so far described a rotation of the leader support will transfer the point of operation of the tool around the leader. In order to shift the point of operation of the tool during the rotation of the leader so as to change the direction of its path the rod 32 is connected to a yoke 43 mounted to slide upon guides 44 carried by the bracket 19. The yoke 43 embraces a rectangular block 45 which is swiveled upon a crank pin 46 slidably mounted in a slot 48 formed in a platform 49. The platform is secured to the upper end of a vertical shaft 50 the upper end of which is journaled in a bearing carried by the bracket 19 and the lower end of which is journaled in a step bearing 51 carried by the shaft 11. The crank pin 46 is mounted on a block 52 which slides in ways 53 formed in the platform 49. To hold the block 52 in any desired position of adjustment it carries a bolt 47 by means of which the crank pin 46 and block 52 may be clamped to each other and to the platform 49. With this construction the tool 24 is reciprocated toward and from the axis of the leader by a crank which is driven by the rotation of the shaft 50. As it is desirable to vary the throw of the crank the upper face of the platform 49 is provided with a scale to serve as a guide to the operative in adjusting the yoke 43 and its associated parts nearer to or farther from the axis of the shaft 50. To guide the tool 24 to reciprocate radially of the leader 1 the bracket 19 carries a horizontal rod 54 arranged in a vertical plane intersecting the axis of the leader. The rod 54 loosely passes through the frame 31 so that the tool may reciprocate freely thereon and thus be constrained to move radially toward and from the axis of the leader.

In order to simultaneously rotate the leader and reciprocate the tool the shaft 50 carries a roll 55 the periphery of which engages the opposed faces of the disks 16 and 20. The roll 55 is slidably mounted on the shaft 50 and may be adjusted thereon to position the roll at any desired distance between the axes of the disks and the peripheries thereof to vary the speed of rotation of the shaft 50. To this end the roll 55 carries a ring 56 which rotates upon an arm 57 loosely embracing the shaft 50 and projecting from a clamp 58 which is mounted on a vertical rod 59 carried by the bracket 19 and the bearing 51. The rod 59 is provided with a scale to serve as a guide for the adjustment of the roll along the shaft 50 by the operative. With this construction when the operative rotates the disk 16 in the direction of the arrow, Fig. 1, the leader and tool are simultaneously rotated and reciprocated respectively.

In using the machine to generate a cam path intended to impart, for instance, a harmonic rise of 4 inches in 90 degrees (technically known as the "time" of the cam path), a harmonic drop of 4 inches in the next 45 degrees, and a dwell during the remaining angle the frame 31 is adjusted upon the rod 54 so that the distance from the center of the shaft 29 to the axis of the leader 1 corresponds to the base circle of the cam path to be generated which, as well known to those skilled in the art, is a circle having its center at the center of the cam shaft and a radius equal to the shortest distance to the theoretical cam curve. The rod 54 is provided with a scale to serve as a guide for the operative in adjusting the tool for the base circle. After this adjustment is made the frame 31 is temporarily held by a screw 60 which clamps the frame 31 to the rod 54. The bolt 33 is then loosened to free the rod 32 and the yoke 43 is then adjusted along the platform 49 until the axis of the swiveled block 45 is two inches from the axis of the shaft 50. This adjustment is made when the platform 49 is positioned so that a mark 61 thereon registers with a mark 62 on the upper face of the bracket 19 at which time the crank is at its limit of movement in one direction. After this adjustment is made the frame 31 is unclamped from the rod 54 and again clamped to the rod 32.

Now it being desired to generate a cam path for imparting to a cam follower a harmonic rise of 4 inches in 90 degrees the roll 55 is adjusted on the shaft 50 to such a point that when the disk 16 is rotated to transfer the pointer 18 from the 0 mark to the 90 mark on the scale the roll 55 will rotate one half a revolution and thus rotate the crank from its limit of movement in one direction to its limit of movement in the other direction. The parts being adjusted as described the operative rotates the disk 16 until the pointer 18 reaches the 90 mark on the scale 17. During the rotation of the disk 16 the leader rotates through 90 degrees and the rotating tool 24 is reciprocated away from the axis of the leader thus generating upon the leader a cam path which will impart to a cam follower a harmonic rise of 4 inches in 90 degrees. To obtain a harmonic drop of 4 inches in the next 45 degrees the roll 55 is adjusted to the 45 mark on the rod 59 so that the roll will again revolve a half rotation as the point travels from the 90 mark to the 135 mark on the scale 17. Then the disk is again rotated until the 135 mark is reached. During this movement of the disk 16 a cam path is generated on the leader which will impart a harmonic drop of 4 inches in 45 degrees. To obtain a dwell during the remaining angle of 225 degrees the axis of the block 45 may be brought in line with the axis of the shaft 50 so that during the continued rotation of the disk 16 to bring the pointer 18 back to 0 or, stated in another way, to complete the 360 degree rotation of the leader the tool remains stationary upon the rod 54. It is preferred, however, to clamp the frame 31 to the rod 54 and unclamp it from the rod 32 in order to prevent the accidental displacement of the tool. The leader is then cut down to the inner working surface of the cam path in readiness for its insertion into the cam cutting machine where it directs the operation of the cutting tool.

While the machine has been described as generating a specific cam path it will be readily apparent to those skilled in the art that the machine is adapted to generate any cam path for imparting to a reciprocating cam follower either a harmonic motion or a dwell as the machine is provided with the necessary adjustments for varying the operation of the tool upon the leader in accordance with the variations in the base circles, rises, drops and times of the cam paths which it may be desired to generate.

While the invention has been illustrated and described in connection with a machine for generating a cam path for imparting harmonic motion to a reciprocating follower it must be understood that this is merely one embodiment of the invention which may have a variety of forms depending upon the kind of motion which it is desired to impart to a follower, the kind of cam to be provided with a cam path, and whether the follower is offset or is mounted to oscillate or reciprocate. Neither is the specific construction and arrangement of parts shown and described essential, nor is the conjoint use of all the features of the invention essential, except so far as specified in the appended claims, and it may be varied or modified without departing from the broader features of the invention.

In the following claims the term "rises" for convenience has been used to denote either "rises" or "drops" or both.

What is claimed as new, is:

1. A cam path generating machine, having, in combination, a leader support, a tool, and means for generating a cam path upon the leader comprising mechanism for rotating the leader, mechanism for reciprocating the tool, while the leader is being rotated and mechanism for constraining the tool to reciprocate radially of the leader, substantially as described.

2. A cam path generating machine, having, in combination, a leader support, a tool for scratching the leader, means for imparting rapid circulatory movements of slight amplitude to the tool, mechanism for imparting additional relative movements to the leader and tool to transfer the point of operation of the tool around the leader, and means for varying the amplitude of the circulatory movements imparted to the tool, substantially as described.

3. A cam path generating machine, having, in combination, a leader support, a tool, means for imparting rapid circulatory movements of slight amplitude to the tool, mechanism for imparting additional relative movements to the leader and tool to transfer the point of operation of the tool around and across the leader, and means for varying the movements of the tool across the leader during the transfer of the point of operation of the tool around the leader, substantially as described.

4. A cam path generating machine, having, in combination, a leader support, a tool, mechanism for imparting rapid circulatory movements of slight amplitude to the tool, mechanism for relatively actuating the support and tool to transfer the point of operation of the tool along the leader in the direction of its circumference and also to move the tool with relation to the support across the leader, and means for varying the movements of the tool across the leader during the transfer of the point of operation along the leader, substantially as described.

5. A cam path generating machine, having, in combination, a leader support, a tool, a guide therefor, and a crank pin and yoke for reciprocating the tool on the guide, substantially as described.

6. A cam path generating machine, having, in combination, a leader support, a tool, a guide therefor, a crank for reciprocating the tool on the guide, a crank shaft, and a single driver for rotating the crank shaft and leader, substantially as described.

7. A cam path generating machine, having, in combination, a leader, a tool, a guide therefor, means for reciprocating the tool on the guide, and means for preliminarily adjusting the tool on its guide in accordance with variations in the base circles of the cams to be generated, substantially as described.

8. A cam path generating machine, having, in combination, a leader, a tool, a guide therefor, a crank for reciprocating the tool on its guide, and means for varying the throw of the crank in accordance with variations in the rises of the cam path to be generated, substantially as described.

9. A cam path generating machine, having, in combination, a leader, a tool, a guide therefor, a crank for reciprocating the tool on its guide, a crank shaft, means for driving the shaft, and means for varying the relative speed of the shaft in accordance with variations in the times of the cam paths to be generated, substantially as described.

10. In a cam path generating machine, a carriage, a vertical shaft rotatably and slidably mounted therein, a leader scratching tool, a carrier therefor, a block for the carrier secured to the shaft, and means for reciprocating the carriage substantially as described.

11. In a cam path generating machine, a carriage, a vertical shaft rotatably and slidably mounted therein, a leader scratching tool, a carrier therefor, a block for the carrier secured to the shaft, manual means for sliding the shaft in one direction, and automatic means for sliding the shaft in the other direction, substantially as described.

12. A cam path generating machine, having, in combination, a leader support, a tool, a mechanical movement for driving the tool, a rotary disk for driving the leader, and a roll actuated by the rotation of the disk for actuating the mechanical movement, substantially as described.

13. A cam path generating machine, having, in combination, a leader support, a tool, a mechanical movement for driving the tool, a rotary disk for driving the leader, a shaft for the mechanical movement, a roll actuated by the rotation of the disk for driving the shaft, and means for varying the position of the roll with relation to the disk to vary the relative speeds of the disk and the shaft, substantially as described.

EDWARD E. FOSTER.

Witnesses:
CHARLES E. GRUSH,
ELMER B. GRUSH.